United States Patent Office 3,092,012
Patented June 4, 1963

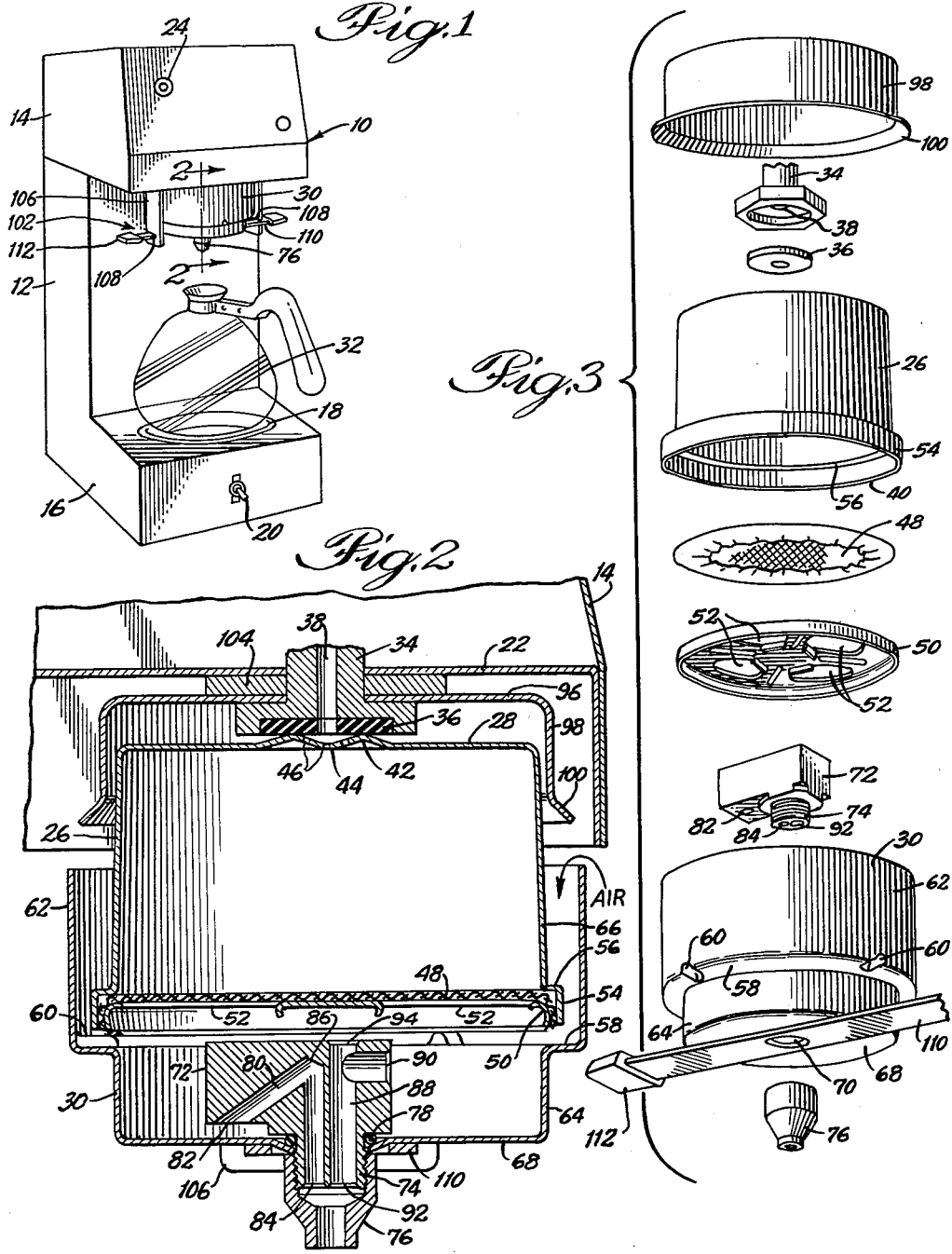

3,092,012
BREWING APPARATUS FOR COFFEE MAKER
Edward J. Ruhnke, Chicago, Ill., assignor to Hill-Shaw Co., Chicago, Ill., a corporation of Illinois
Filed Apr. 6, 1961, Ser. No. 101,189
6 Claims. (Cl. 99—307)

This invention relates to new and improved brewing apparatus which is especially useful in automatic coffee makers.

A number of types of automatic coffee makers are known for repeatedly producing quantities of coffee or other brew, designed particularly for restaurant and similar operations. It is common to employ apparatus which automatically heats water, supplies a predetermined quantity of hot water to a coffee cartridge, and supplies the resulting coffee brew or infusion to a decanter or other container. The coffee maker should be as trouble-free and foolproof as possible. It is especially desirable that the coffee infusion be drained properly from the coffee granules, and that the brew obtained be dispensed to a decanter or the like, evenly, completely and without dripping. In order to overcome the problem of dripping, siphon fittings have been employed to dispense the brew. However, this has given rise to flooding problems which have rendered the operation unsatisfactory.

An important object of the invention is to provide brewing apparatus which operates reliably to brew and dispense coffee and other suitable infusions.

A particular object is to provide apparatus which dispenses the brew completely and without dripping.

Another particular object is to prevent flooding of the brewing apparatus.

An additional object is to provide apparatus which is especially adapted for use in automatic coffee makers of the pressure type.

A further object is to provide simple, compact, economical and reliable brewing apparatus.

These and other objects, advantages and functions of the invention will be apparent on reference to the specification and to the attached drawings illustrating a preferred embodiment of the invention, in which like parts are identified by like reference symbols in each of the views, and in which:

FIGURE 1 is a front perspective view of a coffee maker embodying the new brewing apparatus;

FIGURE 2 is an enlarged vertical axial sectional view of the brewing apparatus; and FIGURE 3 is an exploded perspective view of the brewing apparatus.

In a preferred embodiment, the brewing apparatus of the invention includes a coffee cartridge, water inlet means on the upper end of the cartridge, drain means on the lower end, a cartridge holder, an infusion reservoir in the holder having a discharge opening, siphon discharge means in the reservoir associated with the discharge opening, and overflow discharge means in the reservoir associated with the opening. It is further preferred to provide vent means between the cartridge and the cartridge holder.

Referring to the drawings, an automatic coffee maker of the pressure type is indicated by the number 10. A housing 12 is provided, which includes a forwardly extending head 14 at the top of the coffee maker and a heating stand 16 at the bottom on which are mounted a conventional hot plate 18 and a hot plate switch 20. As illustrated in FIGURE 2, the head 14 includes an upwardly recessed support panel 22. Apparatus for supplying a predetermined quantity of hot water under pressure is mounted on the panel and is connected to a tank for heating and storing water, which may be conventional types of apparatus and are not illustrated. A brew button 24 may be provided on the face of the head 14, for initiating a brewing cycle.

A coffee cartridge 26 is removably mounted below the projecting head 14 of the housing, with the upper end 28 of the cartridge enclosed within the head. The cartridge is received within a cartridge holder 30 which is removably secured in the coffee maker 10. The coffee infusion is discharged to a conventional decanter 32 seated on the hot plate 18.

Hot water is supplied to the brewing apparatus, and it may be under the pressure existing in the city main, for example. The water for brewing is conducted to a hot water supply nozzle 34 mounted in the support panel 22 of the housing head. A sealing washer or gasket 36 of rubber or other suitable material is inserted in a lower concavity in the supply nozzle, and it is provided with a central opening registering with the nozzle opening 38.

The coffee cartridge or canister 26 is generally circular and has a closed upper end 28 and an open lower end 40. An upwardly extending circular ridge 42 is formed in the center of the upper end 28, and the end portion enclosed by the ridge is formed as a conical concavity 44. A plurality of spray orifices 46 are disposed around the axis of the cartridge, for supplying water under pressure in various directions to coffee granules which are contained in the cartridge. The upper ridge 42 of the cartridge is pressed against the seal 36, to effect a tight connection to the supply nozzle 34.

The coffee granules are supported on a foraminous filter member or cloth 48, in turn supported on top of a filter frame 50 having a plurality of large openings 52, with the filter cloth elastically held around the perimeter of the filter frame. The filter frame and cloth thereon are press fitted within an enlarged circular rim 54 at the open end 40 of the cartridge, and they abut against an outwardly extending shoulder 56 joining the rim and the body of the cartridge.

The cartridge 26 is supported on its rim 54 by an inner outwardly extending circular ledge 58 on the generally circular holder 30. The holder ledge is provided with a plurality of ridges 60 therearound, which provide vent means between the cartridge 26 and the cartridge holder 30. An upper enlarged side wall 62 is joined to the ledge, and it is spaced outwardly from the cartridge rim 54 to provide free communication of the holder with the surrounding atmosphere. The side wall extends upwardly around the cartridge for a substantial distance, as a safeguard against overflowing the holder.

The holder includes a lower side wall 64 which is substantially aligned with the side wall 66 of the body of the cartridge, for receiving the coffee infusion which passes through the filter cloth 48 and the filter frame 50. The lower side wall 64 of the holder and a flat base or bottom 68 thereon form an infusion reservoir in the holder. A central discharge opening 70 is provided in the bottom wall.

As hot water under pressure is forced through the cartridge 26 and the filter 48, it must be removed sufficiently rapidly to prevent flooding of the cartridge. It is also desirable that the coffee infusion be dispensed from the cartridge holder 30 in a steady stream, without spurting. When the predetermined amount of coffee has been dispensed, flow should be terminated without dripping. Thereafter, further dripping or flow due to any drainage of residual liquid from the coffee grounds should be prevented. These considerations are especially important when the electric hot plate 18 is provided or when other electrical connections may be affected.

The invention provides a novel and improved infusion discharge block 72 which is mounted in the holder discharge opening 70. A threaded leg 74 on the block extends through the opening to the exterior of the holder bottom wall 68. A discharge nozzle 76 is there connected to the leg in threaded engagement, and it secures the block in position in the reservoir. The connection is made liquid-tight by an O-ring seal 78. The nozzle is directed to dispense the coffee into the mouth of the decanter 32.

The block 72 is bored to provide an upwardly bent siphon conduit 80 therein. The conduit terminates at one end adjacent the bottom wall 68 in an opening 82 closely adjacent the wall, for draining substantially all of the infusion from the holder 30. The remaining end of the siphon conduit terminates in a discharge opening 84 at the end of the leg, discharging into the nozzle 76. The bend 86 uppermost on the siphon conduit 80 is spaced below the filter frame 50, to provide space between the liquid in the holder and the frame. The diameter of the siphon conduit 80 is sufficiently large to accommodate the liquid flow from the cartridge while avoiding a large diameter such as would cause the infusion to be dispensed in spurts.

The discharge block 72 is also bored to provide an overflow conduit 88 having a greater diameter than the siphon conduit 80. It includes an opening 90 at the elevation of the siphon top 86, and a discharge opening 92 in the leg 74. Optionally, the overflow conduit may include a top opening 94 for direct-through flow of coffee infusion. The overflow conduit effectively prevents flooding in the brewing operation.

The liquid level in the reservoir of the holder 30 is kept below the filter frame 50, and the liquid communicates freely with the atmosphere through the vent means provided by the ridges 60 and by communication along the holder upper wall 62. When siphoning stops, flow of the coffee brew through the nozzle 76 terminates abruptly, without dripping. If allowed to stand, subsequent dripping from the cartridge 26 may accumulate a small quantity of brew in the holder 30 which does not overflow the siphon or overflow conduit. This requires, for example, about 3 oz. of liquid, whereas the drippings may total about one-half the quantity required for discharge.

A cartridge cap or centering hood 96 is secured between the hot water supply nozzle 34 and the support panel 22. It includes a circular centering side wall 98 and a lower outwardly flared rim 100. The cap insures the proper connection of the cartridge upper ridge 42 to the supply nozzle. Should any leakage occur, the cap also confines the liquid. The wall 98 has a lesser diameter than the upper wall 62 on the cartridge holder 30, so that any liquid from above is collected in the holder and causes no problem.

The holder 30 and the cartridge 26 received therein are removably secured in the coffee maker 10 by bayonet locking means generally indicated by the number 102 in FIGURE 1. The locking means include an inverted U-bracket 104 which is secured between the hot water supply nozzle 34 and the support panel 22, above the centering cap 96. The bracket includes two diametrically opposed depending latch arms 106. A latching slot 108 is provided in each of the arms, and the slots are tapered upwardly and face in opposite directions. A resilient support and locking arm 110 is secured on the bottom 68 of the holder 30 and extends laterally outwardly from the holder. The ends of the locking arm are provided with handle grips 112. When assembling the apparatus for brewing, the holder 30 supporting the filled cartridge 26 is raised by grasping the handles 112, moving the cartridge into the cap 96 where the cartridge is automatically centered, and turning the locking arm 110 slightly about its axis to engage the latch arms 106 in the slots 108 therein. The brew button 24 is pressed, and brewing and filling the decanter 32 takes place automatically.

In this manner, the invention provides a reliable and much improved brewing apparatus, which is especially suited for commercial use. The apparatus is clean, safe, easy to operate, compact and economical.

It will be apparent that various changes and modifications may be made in the construction and arrangement of the apparatus, within the spirit and scope of the invention. It is intended that such changes and modifications be included within the scope of the appended claims.

What I claim as new and desired to secure by Letters Patent of the United States is:

1. Brewing apparatus for a coffee maker which comprises a coffee cartridge, water inlet means on the upper end of said cartridge, drain means on the lower end of said cartridge, a cartridge holder receiving said cartridge lower end, said holder communicating with the atmosphere, an inner ledge on said holder adapted for supporting said cartridge, ridge means on said ledge providing vent means between said cartridge and said cartridge holder, an infusion reservoir in said holder, having a discharge opening therein, and discharge means in said reservoir associated with said discharge opening comprising a discharge fitting having a siphon conduit therein communicating with said discharge opening and an overflow conduit therein communicating with said discharge opening.

2. Brewing apparatus for a coffee maker which comprises a coffee cartridge, water inlet means on the upper end of said cartridge, a cap receiving said cartridge upper end, water supply means on said cap communicating with said cartridge inlet means, drain means on the lower end of said cartridge, a cartridge holder receiving said cartridge lower end, said holder communicating with the atmosphere, an inner ledge on said holder adapted for supporting said cartridge, ridge means on said ledge providing vent means between said cartridge and said cartridge holder, an infusion reservoir in said holder, having a discharge opening therein, siphon discharge means in said reservoir associated with said discharge opening, and overflow discharge means in said reservoir associated with said discharge opening.

3. Brewing apparatus for a coffee maker which comprises a coffee cartridge, water inlet means on the upper end of said cartridge, a cap receiving said cartridge upper end, water supply means on said cap communicating with said cartridge inlet means, drain means on the lower end of said cartridge, a cartridge holder receiving said cartridge lower end, said holder communicating with the atmosphere, an inner ledge on said holder adapted for supporting said cartridge, ridge means on said ledge providing vent means between said cartridge and said cartridge holder, an infusion reservoir in said holder, having a discharge opening therein, a discharge fitting in said reservoir associated with said discharge opening, a siphon conduit in said discharge fitting, and an overflow conduit in said discharge fitting.

4. In a coffee maker including means for supplying hot water under pressure to a coffee cartridge, the combination of a cup-shaped coffee cartridge removably connectable to said supply means, water inlet means on the upper end of said cartridge communicating with said supply means, drain means detachably connected on the lower end of said cartridge, a cartridge holder for supporting said coffee cartridge, an infusion reservoir in said holder, having a discharge opening therein, said reservoir communicating with the atmosphere siphon discharge means in said reservoir associated with said discharge opening, overflow discharge means in said reservoir associated with said discharge opening, and means on said holder for removably securing said cartridge and holder in said coffee maker.

5. Brewing apparatus for a coffee maker which comprises a coffee cartridge having an opening in the top thereof and being open at the bottom, water inlet means on the upper end of said cartridge in communication with said top opening, filter means on the lower end of said cartridge for supporting the coffee in the cartridge, a cartridge holder supporting said cartridge and being spaced therefrom so as to define vent means therebetween, an infusion reservoir defined in said holder, having a discharge opening in the bottom thereof, said infusion reservoir communicating with said vent means, discharge means in said reservoir communicating with said discharge opening, said discharge means having a siphon passage communicating with said discharge opening and an overflow passage communicating with said discharge opening.

6. Brewing apparatus for a coffee maker which comprises a coffee cartridge having an opening in the top thereof and an opening in the bottom thereof, water inlet means on the upper end of said cartridge communicating with said top opening, drain means on the lower end of said cartridge for supporting the coffee in the cartridge, a cartridge holder supporting said cartridge and being spaced therefrom so as to define vent means therebetween, an infusion reservoir in said holder, having a discharge opening therein, a discharge fitting detachably connected in the bottom of said reservoir and communicating with said discharge opening, a siphon conduit in said discharge fitting, and an overflow conduit in said discharge fitting.

References Cited in the file of this patent

UNITED STATES PATENTS

| | | |
|---|---|---|
| 1,831,013 | Kouyoumjian | Nov. 10, 1931 |
| 1,861,481 | Rabjohn | June 7, 1932 |
| 2,881,693 | Wells | Apr. 14, 1959 |
| 3,034,417 | Bunn | May 15, 1962 |

FOREIGN PATENTS

| | | |
|---|---|---|
| 933,496 | France | Jan. 1, 1948 |